July 17, 1951  H. L. HARTZELL  2,560,644

FLEXIBLE SHAFT COUPLING

Filed March 14, 1945

INVENTOR
Herman L. Hartzell
BY
Spencer, Hardman & Fehr
His ATTORNEYS

Patented July 17, 1951

2,560,644

UNITED STATES PATENT OFFICE 2,560,644

FLEXIBLE SHAFT COUPLING

Herman L. Hartzell, Anderson, Ind., assignor to General Motors Corporation, Detroit, Mich., a corporation of Delaware Application March 14, 1945, Serial No. 582,761

6 Claims. (Cl. 64—14)

This invention relates to a drive shaft coupling having provisions for minimizing shocks or vibration before they are transmitted from the drive shaft to the driven shaft.

This invention is particularly adapted for use with an ignition distributor and unit which is interchangeable with a magneto. In such construction it is the common practice to provide the timer distributor unit with a horizontal shaft in substitution for the usual horizontal shaft of the magneto and this horizontal shaft drives the vertical shaft of the timer distributor. In this connection it is an object of the present invention to provide a flexible coupled drive shaft having overall dimension so that it will be interchangeable with other shafts now in use.

Another object of the present invention is to provide a two-piece torsional shock absorbing drive shaft with rubber not molded in place. To accomplish this object a pair of concentric members are provided and a rubber boot. The boot is fitted over the end of the inner member and stretched by an assembler from its normal condition to a cross dimension so that same will fit snugly within the outer member. Upon release of the boot it will tend to return to its normal condition filling the space between the two concentric members.

Another object of the present invention is to provide a drive shaft assembly whereby two concentric members may be operatively connected one with the other for unitary rotation but wherein yieldable means are provided to allow slight rotation of one of the members relative to the other member to absorb the torsional impacts imparted to either member.

Another object of the invention is to facilitate the assembly of the horizontal and vertical shafts with a housing whereby these two shafts together with their bearings and the gears associated with the respective shafts may be assembled as subassemblies with the housing.

Further objects and advantages of the present invention will be apparent from the following description, reference being had to the accompanying drawings wherein a preferred embodiment of the present invention is clearly shown.

Figure 1:
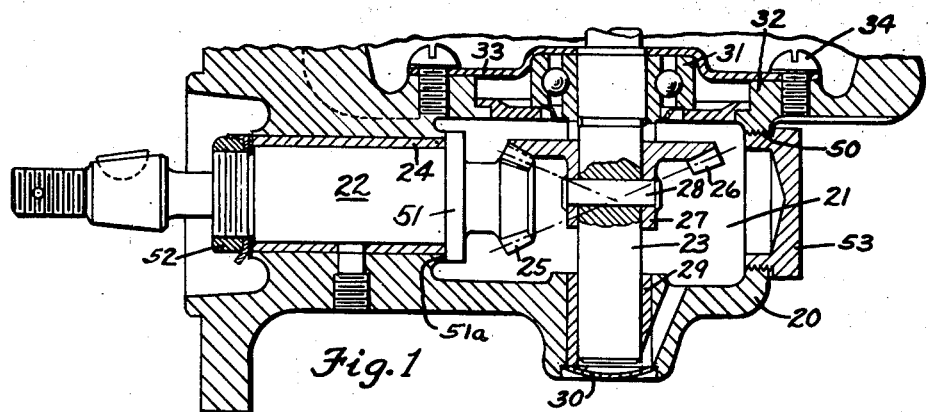
Fig. 1 is a fragmentary sectional view of a housing showing the drive shaft assembly embodying the present invention.
Figure 3:
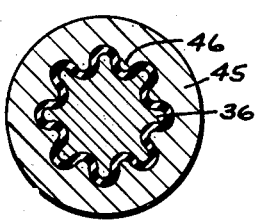
Fig. 3 is a sectional view taken on line 3—3 of Fig. 2.
Figure 2:
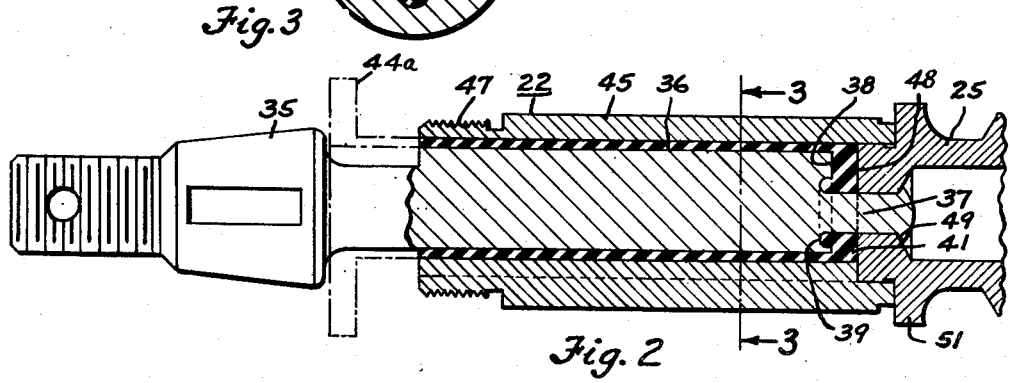
Fig. 2 is a sectional view on an enlarged scale of the drive shaft.
Figure 4:
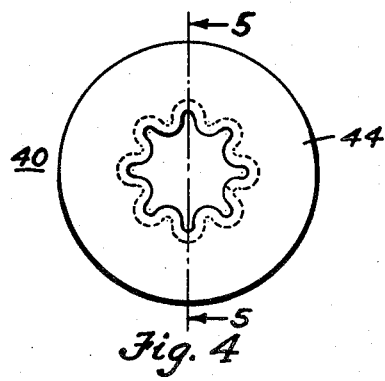
Fig. 4 is a plan end view of the rubber boot or sleeve.

Referring to Fig. 1 a housing 20 is provided with a chamber 21 for the reception of shafts 22 and 23 respectively and the bearings and gears associated therewith. The shaft 22 is journalled in a plain bearing 24 supported by the housing 20 at one side of the chamber 21. The shaft 22 drives a bevel gear 25 which meshes with a bevel gear 26 having a hub 27 attached to the shaft 23 by a pin 28. The end of the shaft 23 is journalled in a plain bearing 29 at the bottom of the chamber and closed by a plug 30. The shaft 23 is supported by a ball bearing 31 retained upon a wall 32 of the housing 20 by a retainer ring 33 secured to the wall by screws 34.

Figure 5:
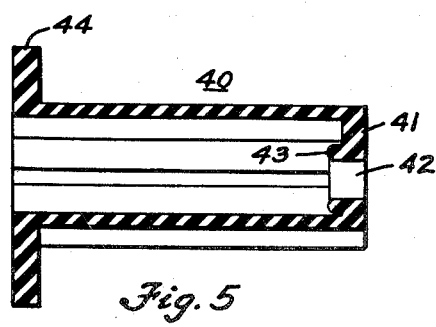
Fig. 5 is a sectional view taken on line 5—5 of Fig. 4.

As is more clearly shown in Figs. 2 to 5, inclusive, the drive shaft 22 comprises a metallic drive shaft 35 having a series of radially disposed ribs 36 forming a fluted portion and having a reduced portion 37 to provide a shoulder or abutment 38. The shoulder has an annular groove 39. The fluted portion is adapted to be enclosed by a corrugated boot or sleeve 40 of yieldable stretchable material, for example soft rubber, having a closed end 41 provided with an aperture 42 through which the extension 37 projects. The inner surface of the closed end 41 has an annular bead 43 adapted to fit into the annular groove 39. The longitudinal dimension of the sleeve corresponds to the contour of the corrugated portion of the shaft 35. The sleeve 40 as shown in Fig. 5 is provided by a lateral flange 44 but which is later severed from the sleeve after same is assembled in a metallic sleeve 45.

The shaft 35 with the rubber sleeve therearound is adapted to be inserted within the metallic sleeve 45 having a series of inwardly extending ribs 46 corresponding to the outer surface of the rubber boot. The sleeve 45 has attached thereto the pinion or gear 25 by brazing. The other end of the sleeve 45 is provided with a threaded portion 47. Before the shaft 35 and boot 40 assembly is inserted into the sleeve 45 the rubber boot is first stretched. The normal cross dimensions of the rubber boot is greater than the inner cross dimensions of the metallic sleeve, thus the boot is stretched longitudinally. This is accomplished by getting ahold of the flange 44 and elongating same to the position indicated by the dot and dash lines 44a in Fig. 2. This stretching reduces the cross dimensions of the rubber boot to permit the shaft and boot to be slid into the sleeve 45 with the extension passing through an aperture provided by the gear 25, until the wall 41 engages the end 48 of the gear within the sleeve 45. When that occurs the flange 44a is released allowing the rubber boot 40 to approach its normal condition, the diameter increasing until it is firmly compressed between the shaft 35. After the assembler has released the flange he will rivet over the end 37 against a shoulder 49 to compress the bottom wall 41 of the boot. The flange 44a is then cut off at the threaded end of the sleeve.

The whole assembly forming the shaft 21 and gear 25 is assembled within the housing 20 by inserting same through a threaded aperture 50 in the housing 20. A flange 51 provided by the gear 25 engages a shoulder 51a provided by the housing after which the shaft assembly 22 is secured in place by a nut 52. The aperture 50 is closed by a threaded cap 53.

While the embodiment of the present invention as herein disclosed, constitutes a preferred form, it is to be understood that other forms might be adopted, all coming within the scope of the claims which follow.

What is claimed is as follows:

1. A shock absorbing drive shaft unit comprising; a shaft having external fluted portions; a sleeve having internal fluted portions about the shaft; a fluted sleeve of yieldable material under radial compression and longitudinal elongation disposed between the shaft and sleeve to effect a yieldable driving connection between the shaft and sleeve; a gear element secured to one end of the sleeve and having an opening; a reduced portion carried by the shaft extending loosely through the opening of the gear element; and connecting means carried by the reduced portion of the shaft to associate the shaft with the gear element.

2. A shock absorbing drive shaft unit comprising, a female element having a plurality of longitudinal recesses therein extending the full length thereof; a male element provided with a plurality of longitudinal ribs shaped to correspond with the recesses of the female element and extending into one end of the female element, the surfaces of the recesses providing spaces between the corresponding surfaces of the ribs, said male element having a reduced portion at the end extending into the female member to provide a shoulder having an annular groove; a shock absorbing sleeve under radial compression and axial elongation disposed in said spaces substantially the length of the ribs, said sleeve having an internal flange abutting the shoulder of the male element and having an annular bead projecting into the annular groove; a driving element having a reduced plug portion to provide a flange, said reduced plug portion extending into the other end of the female element and having an opening to receive the reduced portion of the male element; and means including a part of the reduced portion of the male element for loosely securing the male element to the driving element and for maintaining the internal flange of the shock absorbing sleeve between the shoulder of the male element and the end of the plug portion of the driving element under compression.

3. A shock absorbing shaft unit comprising, a shaft having a main portion provided with external longitudinal corrugations and having an integral reduced cylindrical end; a sleeve having longitudinal internal corrugations surrounding the shaft; a member of yieldable and stretchable material under compression between the corrugations; a driving member loosely fitted over the reduced end of the shaft and engaging an end of the yieldable and stretchable member; means for attaching the driving member to the sleeve; means including portions of the reduced end to associate the shaft with the driving member.

4. A shock absorbing shaft unit comprising, a fluted shaft having an integral reduced end; an internal fluted sleeve about the shaft, a soft rubber sleeve under radial compression and longitudinal elongation fitted over the reduced end and disposed between the flutes to effect a yieldable driving connection between same; a driving element having an opening fitted loosely over the reduced end; means for attaching the element firmly to the sleeve, said element adapted to drive a part; and means associated with the reduced portion to hold the shaft to the element.

5. A shock absorbing shaft unit comprising; a shaft having a main portion provided with external longitudinal corrugations and having an integral reduced cylindrical portion at one end extending axially from the main portion; a sleeve having internal longitudinal corrugations about the shaft and having a substantial clearance with respect to the shaft; a cup-shaped member of yieldable material highly compressed surrounding the reduced cylindrical portions and between the corrugations and completely filling the substantial clearance between the corrugations for forming a shock resisting, driving connection between the shaft and sleeve; a hollow driving element mounted on the reduced cylindrical portion, said element having a reduced portion extending into the sleeve and engaging the rubber-like member; and means including portions of the reduced cylindrical portion for holding the shaft in position and for maintaining the yieldable material about the reduced cylindrical portion under compression.

6. A shock absorbing shaft unit comprising, a sleeve and a shaft having a main portion separated from each other by a substantial clearance, the opposing longitudinal surfaces of main portion of the shaft and the sleeve being corrugated, said shaft carrying a reduced cylindrical portion at one end; a cup-shaped member of yieldable compressed material disclosed about the reduced cylindrical portion and completely filling the substantial clearance between the main portion of the shaft and the sleeve; a hollow member, adapted to drive or be driven, mounted movably on the reduced cylindrical portion and having its inner end engaging the yieldable material; means for attaching the hollow member to the sleeve; and means including associated portions of the reduced cylindrical portion to associate the shaft with the hollow member and for keeping the yieldable material under compression.

HERMAN L. HARTZELL.

REFERENCES CITED

The following references are of record in the file of this patent:

UNITED STATES PATENTS

| Number | Name | Date |
|---|---|---|
| 1,017,819 | Sundh | Feb. 20, 1912 |
| 1,732,657 | Picquerez | Oct. 22, 1929 |
| 1,867,540 | Rosenberg | July 12, 1932 |
| 1,892,037 | Crews | Dec. 27, 1932 |
| 1,979,969 | Geyer | Nov. 6, 1934 |
| 2,110,783 | Welker | Mar. 8, 1938 |
| 2,199,926 | Swennes | May 7, 1940 |
| 2,259,460 | Dexter | Oct. 21, 1941 |

FOREIGN PATENTS

| Number | Country | Date |
|---|---|---|
| 403,856 | Great Britain | 1934 |